United States Patent

[11] 3,557,899

| [72] | Inventors | Edward G. Longinette Lucas and Hunt, Mo. 5323 Lucas and Hunt Road, St. Louis, Mo. 63121; Charles W. Porter, 5035 Oleatha, St. Louis, Mo. 63139 |
|---|---|---|
| [21] | Appl. No. | 608,322 |
| [22] | Filed | Jan. 10, 1967 |
| [45] | Patented | Jan. 26, 1971 |

[54] RIOT CONTROL DEVICES EMPLOYING A MODULATED STIMULUS FREQUENCY
12 Claims, 6 Drawing Figs.

[52] U.S. Cl............................................................... 181/.5, 43/124
[51] Int. Cl............................................................. G10k 10/00, A01m 29/00
[50] Field of Search.......................................... 181/.5; 43/124; 340/15

[56] References Cited

UNITED STATES PATENTS

| 1,399,877 | 12/1921 | Pupin............................ | 340/8 |
| 2,922,999 | 1/1960 | Carlin........................... | 340/384 |
| 3,328,908 | 7/1967 | Moe............................... | 43/131 |

OTHER REFERENCES

Frings et al. PEST CONTROL WITH SOUND 1 Sound No. 6 (pgs 13— 17) 1962

Primary Examiner—Rodney D. Bennett, Jr.
Assistant Examiner—William T. Rifkin
Attorney—Robert J. Schaap ABSTRACT: An apparatus and method for forcibly dispersing animals having a brain resting frequency by generating a stimulus frequency in the audible frequency spectrum which is a multiple of the brain resting frequency and applying the stimulus frequency to the brain of an animal having a resting frequency, and also modulating the stimulus frequency at the brain resting frequency.

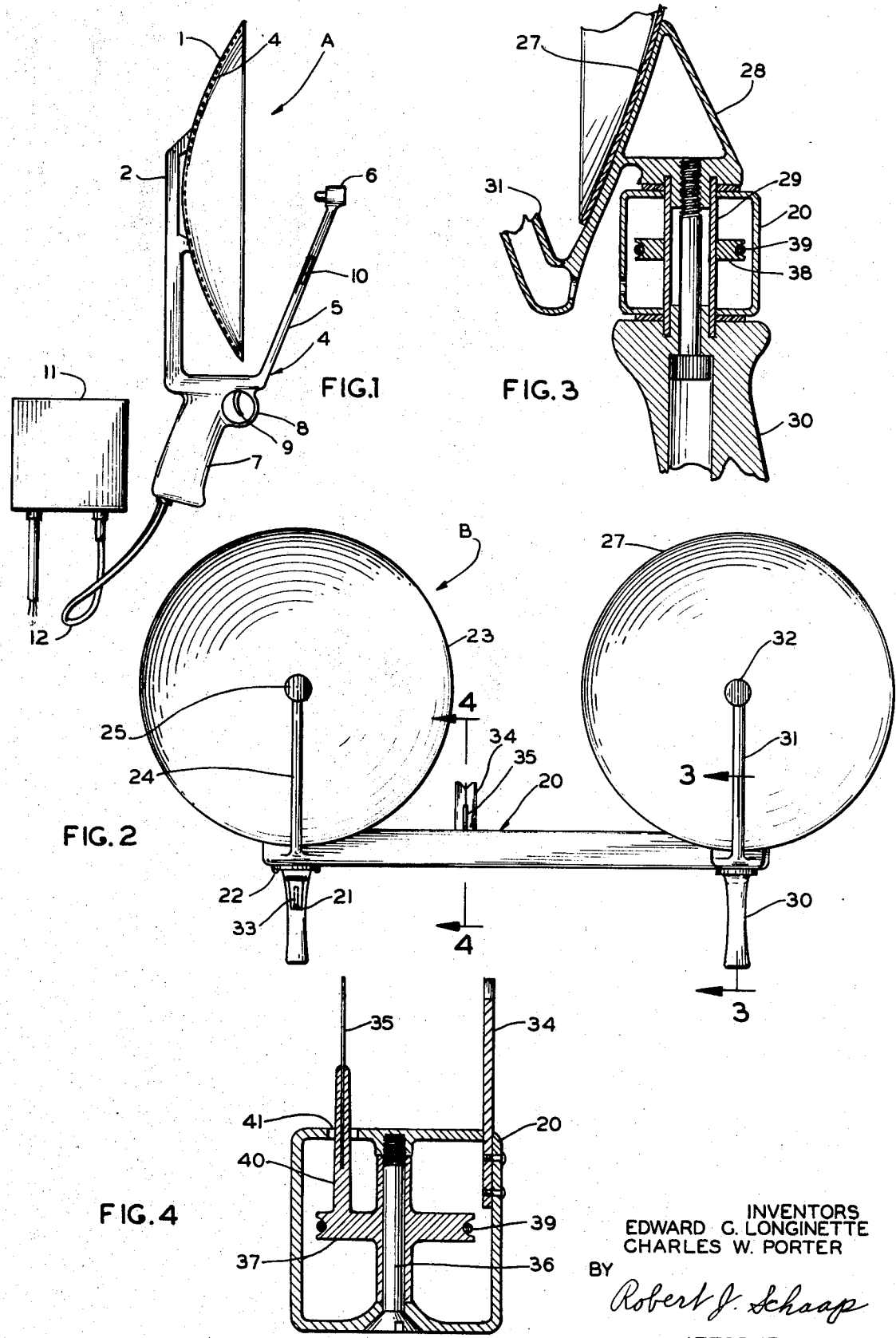

RIOT CONTROL DEVICES EMPLOYING A MODULATED STIMULUS FREQUENCY

This invention relates in general to riot control devices and more particularly, to riot control devices which employ sonic waves as a means of creating dispersion.

The problem of controlling and eliminating riots is one that has beset law officers for a long period of time. This problem has become even more acute in recent times where various rights demonstrations and other verbal means for redress of grievances has sometimes developed into unruly crowds and oftentimes riots. The problem of dealing with a riot is a rather difficult one not only from the physical danger standpoint, but from the psychological aftermath which results in cries of "police brutality." In the dispersal of the people in the riot crowd, there is almost always physical contact between the populace and the law enforcement officer. Since the crowds often outnumber the law enforcement officers present, there is always the omnipresent danger of physical injury to the law enforcement officer. Furthermore, by virtue of the physical contact, the parties in the riot group use this contact even though necessary to disperse the people, as a justification to complain of police brutality.

The only real effective devices presently available to the law enforcement officer in the containment and elimination of riots are the nightstick, the riot gun and the cattle prod. While the cattle prod may not necessarily involve any physical injury to the person who is electrically jolted from the same, it nevertheless involves physical contact. The nightstick likewise involves physical contact. The riot gun is the most severe of these devices and is generally only used when there is the presence of direct and potential danger to the law enforcement officer. The law enforcement officers have often resorted to the use of tear gas as a means of dispersing crowds. However, tear gas often present some deleterious effects and often affects innocent bystanders as well.

In is therefore, the primary object of the present invention to provide a riot control device which enables law enforcement officers to rapidly disperse riot crowds without creating any permanent injury to any individual in the crowd.

It is another object of the present invention to provide a riot control device of the type stated which eliminates physical contact between the law enforcement officer and any other individual.

It is a further object of the present invention to provide a riot control device of the type stated which is relatively simple to use and is relatively safe to the user.

It is an additional object of the present invention to provide a riot control device of the type stated which operates on the principle of acoustic stimuli.

It is also an object of the present invention to provide a riot control device of the type stated which is relatively inexpensive to manufacture and to operate.

With the above and other objects in view, our invention resides in the novel features of form, construction, arrangement and combination of parts presently described and pointed out in the claims.

In the accompanying drawings:

FIG. 1 is a side elevational view of a riot control device constructed in accordance with and embodying the present invention;

FIG. 2 is a front elevational view of a modified form of riot control device constructed in accordance with and embodying the present invention;

Figure 5:
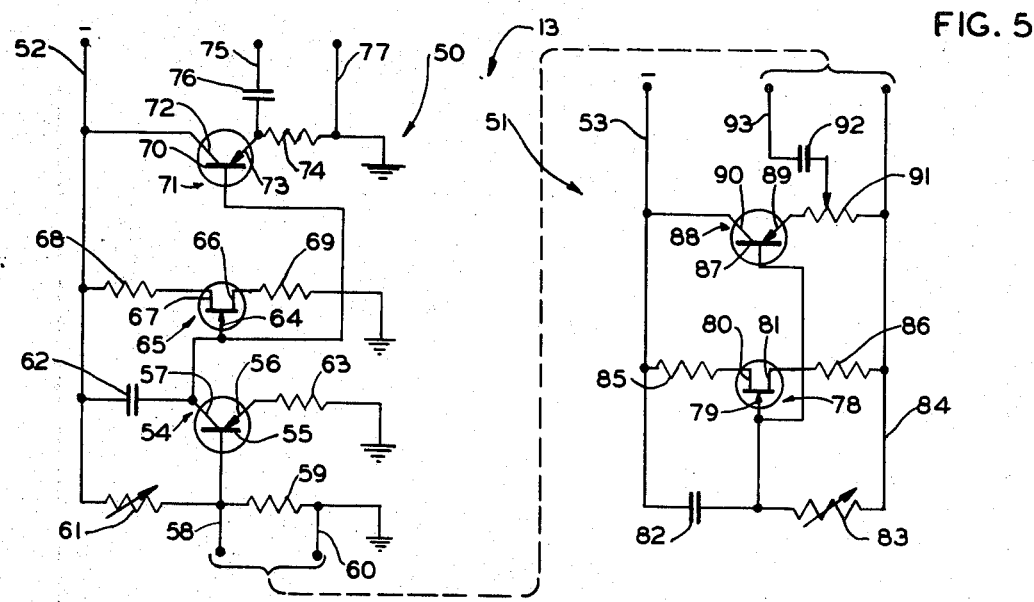
Figure 6:
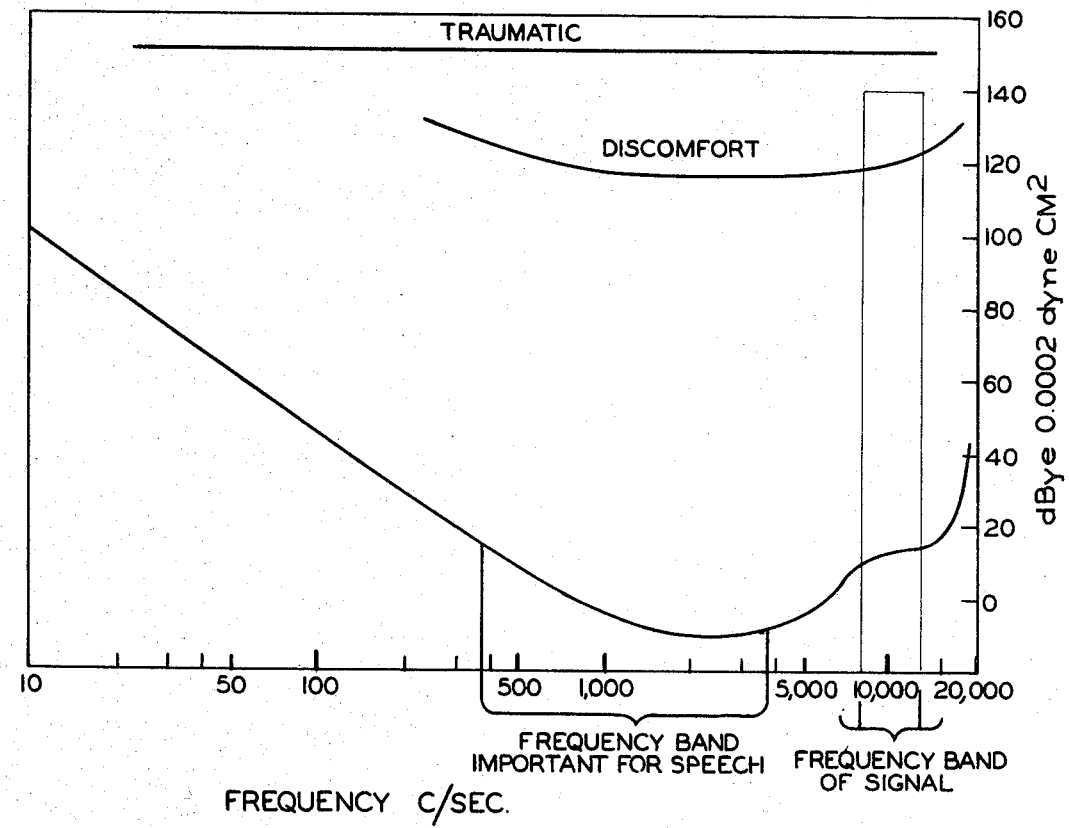

FIGS. 3 and 4 are sectional views taken along lines 3—3 and 4—4, respectively, of FIG. 2;

FIG. 5 is a schematic view of the the electrical circuitry of the riot control device of the present invention; and FIG. 6 is a graph showing the frequency of sound waves as a function of the decibel range and showing the ranges of effects on human beings.

Generally speaking, the present invention relates to a riot control device which achieves riot dispersal with acoustic stimuli. The animal brain has a specific resting frequency or so-called "alpha rhythm" which lies between a frequency range of 10 and 11 cycles per second, and has a minimum and maximum limits of approximately 8 and 13 cycles per second. The device of the present invention employs a fundamental frequency from 8,000 cycles per second to 13,000 cycles per second which extremes are frequency modulated at 10 cycles per second.

The device of the present invention employs a high frequency transducer of so-called "tweeter" which is located near the cone of a parabolic reflector. The amplifier is designed to produce the acoustic stimulus frequencies which are enhanced and concentrated by the reflector. The device is also provided with a handle and trigger mechanism for actuating the device at the will of an operator. The device of the present invention also provides a preamplifier circuit which comprises a frequency modulated circuit and a 10 cycle per second modulating circuit for generating the necessary pulses. These pulses are next transmitted to a conventional power power amplifier circuit from which the amplified pulses are transmitted to the high frequency amplifier.

The present invention also provides a modified form of riot control device which employs two or more of the aforementioned components; that is at least two parabolic reflectors and a high frequency amplifier in each of the parabolic reflectors. In this latter type of device the two or more components are coupled so that they operate in unison. Each of the devices of the present invention can be made so that they can be mounted stationarily such as in a police car or similar vehicle or so that they can be made in a portable form.

Referring now in more detail and by reference characters to the drawings which illustrate practical embodiments of the present invention A designates a riot control device which comprises a parabolic reflector 1 which is mounted on the upstanding leg 2 of a bracket 3 in the manner as illustrated in FIG. 1. The reflector 1 is polished on its interior surface 4 and may be made of any suitable material such as polished aluminum. The parabolic reflector 1 is sufficiently rigid so that no resonance is created. The bracket 4 is integrally formed with an upstanding leg 5 in the front of the cone portion of the reflector 1 and terminates in approximate horizontal alignment with the apex of the cone of the reflector 1. Mounted on the upper end of the leg 5 is a high frequency speaker 6 more often referred to as a "tweeter."

Mounted on the underside of the bracket 4 is a handle 7 which may be secured to the bracket 4 by any conventional means such as machine screws. The handle 7 is integrally provided with a trigger guard 8 which houses a conventional trigger-switch 9. The trigger-switch 9 is electrically connected to the speaker 6 by means of leads 10 which may be secured to the underside of the brackets 5 or disposed internally thereof as illustrated in FIG. 1. The trigger-switch 9 is, in turn, electrically connected to a conventional power amplifier 11 through leads 12. Inasmuch as this latter item is conventional in its construction, it is neither illustrated nor described herein. However, the power amplifier 11 should be rated at least 100 watts.

The device of the present invention is designed to achieve riot dispersal by acoustic stimuli. The device is designed to produce a stimulus frequency which is believed to affect the brain resting frequency of an animal. The theory of operation is more fully described in detail hereinafter. The electrical circuit which is designed to produce the stimulus frequency is more fully illustrated in FIG. 5, and actually serves as preamplifier 13, which, in turn, is connected to the power amplifier 11.

It is possible to provide a modified form of riot control device B substantially as illustrated in FIG. 3. The riot control device B comprises a frame housing 20 which is hollow in the interior thereof and which is rectangular in horizontal cross section. The frame housing 20 is preferably made of any lightweight metal such as aluminum. Mounted on one end of the housing is a handle grip 21 which is secured thereto by means of a bolt of sheet metal screw 22, the latter extending upwardly through the frame housing 20. Mounted on the upper end of the frame housing 20 at one transverse end thereof is a parabolic reflector 23, which is also secured to the screw 22 and is substantially identical to the previously described parabolic reflector. An upstanding post 24, which is mounted on the frame housing 20 carries a high frequency speaker 25, which is substantially identical to the speaker 6.

Mounted on the opposite end of the housing 20 is a companion parabolic reflector 27, which has an enlarged base 28 and is secured to a rotatable sleeve 29, the latter being disposed vertically through the frame housing 20 in the manner as illustrated in FIG. 4. The sleeve 29 extends downwardly through the housing 20 and mounted on the lower end thereof is a pistol grip 30, which is rotatable with the sleeve 29 and the reflector 27. Similarly secured to the base 28 of the reflector 27 is an L-shaped upstanding bracket 31, which carries on the upper end thereof a high frequency speaker 32, the latter being substantially identical to the speaker 25. The speakers 25 and 32 are in proximate horizontal alignment with the apex of the cone of each of the reflectors 23, 27. It can be seen that the reflector 23 is fixedly mounted on the frame housing 20 and the pistol grip 21 is also stationarily mounted. The pistol grip 21 is furthermore provided with a trigger-switch 33, which is conventional in its construction and is substantially identical to the trigger-switch 9. The reflector 27 can be rotated through an arc with respect to the frame housing 20, and therefore, can be focused in unison with the reflector 23 at a desired distance merely by rotating the pistol grip 30. By employment of two reflectors, it is possible to substantially increase the effect of the radiation from the reflectors 23, 27.

Also mounted on the upper surface of the housing 20 somewhat centrally of the transverse ends, is a notched rear sight 34 and an upstanding post 35, which serves as a front sight. Also mounted in the interior of the frame housing 20 is an upstanding shaft 36, which carries a rotatable pulley 37. The pulley 37 cooperates with a similar pulley 38 mounted on the sleeve 29 by means of a belt 39. Thus, when the pistol grip 30 is rotated, the sleeve 29 will rotate the pulley 38 and thereby rotate the pulley 37 through the belt 39. Mounted on the peripheral margin of the pulley is an upstanding sight post 40, which extends upwardly through an arcuate slot 41 formed in the upper surface of the frame housing 20. Thus, it can be seen that if the pulley 37 rotates, the sight post 40 will rotate through the same arc as the reflector 27 rotates. The rear sight 34 and the front sight 35 are designed to project the radiation from the reflector 23 at a certain point within a predetermined distance. By aligning the sight post 40 with the front sight 35 and the rear sight 34, it is possible to project the radiation from the reflector 27 at the same point as the radiation from the reflector 23.

It should be understood that it is also possible to employ more than two reflectors for covering a wide area. However, when more than two reflectors are employed, the device becomes rather bulky and difficult to manipulate. Therefore, this type of device is mounted on a vehicle or stationary support.

In order to more fully understand the operation of the device, it is necessary to understand the theory of sound. The audible frequency spectrum is a band width between 20 cycles per second and 20,000 cycles per second. The most acute hearing of the average human being is centered between 400 cycles per second and 4,000 cycles per second. The frequencies necessary for speech communication lie with a band between 500 cycles per second and 2,000 cycles per second. The audible frequency spectrum and the aforementioned band widths are more fully illustrated in FIG. 6 which shows a plot of frequency of sound waves as a function of minimum audible pressure. This graph also illustrates the frequency range of effects on human beings with the riot control device of the present invention.

The animal brain has a specific resting frequency which is often referred to as the alpha rhythm and lies within a frequency ranges of 10 and 11 cycles per second for the vast majority human population. The alpha rhythm has minimum and maximum limits of approximately 8 and 13 cycles per second. The device of the present invention provides acoustic stimulus at 8,000 and 13,000 cycles per second which are frequency modulated at 10 cycles per second. It can thus be seen that the device of the present invention will deliver an acoustic stimulus which is a $10^3$ multiple factor of the alpha rhythm. Furthermore, it can be seen that the device of the present invention will deliver acoustic energy at frequencies well above the vital speech frequencies of 400 to 4,000 cycles per second and, therefore, will not interfere with normal speech.

FIG. 6 illustrates the frequency range necessary for hearing in the speech frequency band which extends from approximately 400 cycles per second to approximately 4,000 cycles per second. However, it in the frequency band used in the device of the present invention, it is necessary to have a minimum of 10 decibels at 8,000 cycles per second and a minimum of 15 decibels at 13,000 per second. At an average frequency of 10,000 cycles per second, it is necessary to have a minimum sound level of 14 decibels. These are the minimum ranges of sound pressure levels at specified frequency ranges necessary to affect the human being.

The device of the present invention is designed only to cause discomfort and not to create any permanent damage or traumatic effects to the individual who is exposed to the radiation from the device. The device of the present invention, therefore, employs a effective dynamic range from 118 decibels at 8,000 cycles per second and 124 decibels at 13,000 cycles per second to a maximum of slightly less than 150 decibels at any frequency within the range of 8,000 and 13,000 cycles per second. As used herein, the term "decibels" is relative to a 0.0002 dyne per centimeter squared minimum audible pressure at 0 decibel level. In normal operation the device of the present invention will employ a minimum of 120 decibels as a sound level with a frequency of 10,000 cycles per second. While the device is capable of using a sound level of up to 150 decibels in the desired frequency range, the the mean preferred sound level is 140 decibels at any frequency within the range 8,000 to 13,000 cycles per second. By use of this less than traumatic sound limit, there is no chance of creating any traumatic effects or any permanent damage to the individual exposed to the radiation from the device.

By reference to FIG. 6, it can be seen that it is possible to use frequencies of less than 8,000 cycle per second to create a condition of discomfort. For example, it is possible to employ a frequency of 150 cycles per second at a sound level of 130 decibels up to a frequency of 8,000 cycles per second at 118 decibels. However, frequencies within this range will interfere with the normal speech frequencies. Furthermore, it is possible to use frequencies beyond 13,000 cycles per second to create discomfort. However, frequencies which do not lie within the range of 8,000 to 13,000 cycles per second do not create a stimulus frequency which is a direct multiple, i.e. a $10^3$ multiple factor of the alpha rhythm.

It can be seen that the output of the riot control device creates the greatest effect on the inner ear of the human being. However, at frequencies employed in this device, the reaction created in the inner ear is a mass reaction rather than one of transfer through the middle ear. An individual can block sound of up to 500 decibels at frequencies in the lower portion of the speech band by placing an interference medium, such as his hands over his ears. However, at frequencies above 2,000 cycles per second, a mass reaction is created due to pressures on the middle ear. Therefore, at the frequencies employed in the present invention, an individual cannot avoid the effects by placing any interference medium over the ear.

The circuit for producing the stimulus forms the preamplifier 13, which is divided into frequency modulated circuit 50 and 10 cycle modulating circuit 51, as illustrated in FIG. 5. The frequency modulated circuit 50 and the modulating circuit 51 each include a power lead 52, 53, which are connnected to a −22½ volt direct current power source (not shown). It should be recognized that a conventional 22 ½ volt battery could be employed as the power source for portability. It is also possible to use a Zener diode regulated transistorized power supply. The frequency modulated circuit 50 also comprises a common emitter amplification transistor 54 having a base 55, an emitter 56 and a collector 57. The base 55 is connected to a conductor 58 and to a 47 k ohm resistor 59 which is, in turn, grounded and connected to a conductor 60. The conductors 58, 60 provide a pair of leads for connection to the 10 cycle modulating circuit 51 in a manner more fully described in detail hereinafter.

The base 55 is also connected to a variable resistor 61 which is, in turn, connected to the lead 52. The variable resistor 61 determines the amount of input voltage, which ranges from −15 volts to −22½ volts and which determines the center frequency. The collector 57 is connected to a 0.005 microfarad capacitor 62, which is connected to the lead 52 and the emitter 56 is connected to a 6.8 k ohm resistor 63 which is, in turn, grounded. The resistor 59 and the capacitor 62 serve as an RC couple providing oscillation of the transistor 54.

The collector 57 is also connected to the emitter 64 of a unijunction transistor 65, which has a base-1 66 and a base-2 67. The base-2 67 is connected through a 470 ohm resistor 68 to the lead 52 and the base-1 66 is grounded through a 470 ohm resistor 69. Each of the resistors 66, 69 serve as feedback resistors and provide balanced feedback to the unijunction transistor 65. The unijunction transistor 65 serves as the oscillator and oscillates from 8,000 to 13,000 cycles per second.

The collector 57 of the transistor 54 and the emitter 64 of the transistor 65 are connected in common and connected to the base 70 of a common emitter amplification transistor 71, which is similar to the transistor 54. The transitor 71 is designed to amplify the total output of the frequency modulated circuit 50. The transistor 71 also includes a collector 72, which is connected to the lead 52 and an emitter 73, which is connected to the ground through a 10 k ohm resistor 74. The emitter 73 is also connected to a conductor 75 which as has a 10 microfarad capacitor 76 therein and the grounded side of the resistor 74 is connected to a conductor 77. The conductors 75, 77 serve as leads for connection to the power amplifier 11. The 10 microfarad capacitor 76 is designed to maintain the given oscillation of the frequency modulated circuit 50.

The modulating circuit 51 is also illustrated in FIG. 5 and generally comprises a unijunction transistor 78 having an emitter 79, a base-1 80 and a base-2 81. The emitter 79 is connected to a 10 microfarad capacitor 82 which is, in turn, connected to the lead 53. The emitter 79 is also connected to a 400 k ohm variable resistor 83 which is in turn connected to a so-called "B+" conductor 84. The base-1 80 is connected to the lead 53 through a 330 ohm resistor 55 and the base-2 81 is connected to the conductor 84 through a 330 ohm resistor 86. The resistors 85, 86 serve as feedback resistors. More importantly, the resistors 85, 86 serve as balancing resistors and provide a balanced condition across the transistor 78 in the same manner as the resistors 68, 69 provided balancing for the transistor 65. The transistor 78 is a pulsating unijunction transistor and provides the modulating circuit 51 with spike waves.

The emitter 79 of the transistor 78 is connected to the base 87 of a common emitter amplification transistor 88 which is also provided with an emitter 89 and a collector 90. The collector 90 is connected directly to the lead 53 and the emitter 89 is connected through a 10 k ohm variable resistor 91 to the conductor 84. The center tap of the variable resistor 91 is connected through a 10 microfarad capacitor 92 to a conductor 93. The conductors 84, 93 serve as leads for connection to the conductors 58, 60 of the frequency modulated circuit 50. The transistor 88 is designed to amplify the total output of the 10 cycle modulating circuit 51 and the capacitor 92 in conjunction with the variable resistors 83, 91 is designed to maintain a given oscillation of the modulating circuit 51. The modulating circuit 51 provides the 10 cycle modulation for the frequency modulated circuit 50 which creates the frequency stimulus ranging from 8,000 to 13,000 cycles per second. Accordingly, the total output of the preamplifier 13 is a stimulus frequency ranging from 8,000 to 13,000 cycles per second modulated at a rate of 10 cycles per second. In essence, the modulating circuit continually varies the frequency modulation from 8,000 to 13,000 cycles per second at a rate of 10 times per second.

All of the resistors in the preamplifier 13 are ½ watt resistors. Furthermore, the components of the preamplifier 13 are not limited to the values described and can be changed as desired in order to vary the performance of the preamplifier 13. These values, however, are the values of the components which have been found to produce the most desirable results.

In the operation of the riot control device A, the power leads 52, 53 are connected to the power source, for energization of the preamplifier 13 and the power amplifier 11. Either of the devices A and B as illustrated and described herein are sufficiently light in weight so that they are portable and capable of being easily carried by a law enforcement officer. At the scene of the riot, the law enforcement officer can operate the device to create the stimulus frequency by actuating the trigger-switch 9. By directing the cone of the reflector 1 at the crowd, the radiation from the device will be directed at the crowd, creating a very offensive condition to any human animal upon which the radiation is directed. The device is most effectively employed by scanning the device so that all animals will be affected by the stimulus frequency in the pathway of the radiation.

The riot control device B is operated in similar manner to the device A. However, the riot control device B is considerably more effective than the device A since the radiation from the reflectors 23, 27 can be directed at the same point.

Moreover, it is possible to aim the radiation of the device B by turning the pistol grip 30 so that the reflector 23 will direct the radiation at the same point as the reflector 27. This can be easily accomplished by the sight mechanism previously described.

The riot control device of the present invention, when actuated, will create an acoustic stimulus which is 1,000 factor of the alpha rhythm and will modulate between the frequency limits of 8,000 and 13,000 cycles per second at a modulation frequency of 10 cycles per second. This acoustic stimulus will create a mass reaction on the middle ear of a human being which cannot be blocked out in any way except by extrication from the radiation.

The riot control device of the present invention produces a stimulus which is very offensive and undesirable to most animals and especially the human being. This condition is so repugnant that the individual will try to extricate himself from this condition by removing himself from the vicinity so that he is able to escape the effects of the radiation. This is the desired result of the device inasmuch as the most immediate problem confronting the law enforcement officer is the dispersal of the riot crowd. This device achieves the desired dispersal without creating any permanent deleterious effects.

The device of the present invention can also be used as a security control device in various applications where manual actuation is not necessary. For example, the device could be effectively located in an enclosure in which unauthorized entrance is to be prevented such as in a bank vault. A typical conventional alarm device which is capable of being energized upon detection of improper entry to the enclosure could be coupled to the device of the present invention and actuate the device of the present invention with the alarm signal. Conventional ultrasonic detection devices which are capable of detecting the presence of an individual coupled to and could actuate the device of the present invention. Upon actuation, the device of the present invention would create an acoustic stimulus which is sufficient to drive the unauthorized individual from the enclosure. It can thus be seen that the device of the present invention has a wide variety of applications where it is or may be desirable to disperse animals having a brain resting frequency.

It should be understood that changes and modifications in the form, construction, arrangement and combination of parts presently described and pointed out in the claims can be made and substituted for those herein shown without departing from the nature and principal of our invention.

We claim:

1. The method of dispersing animals having a brain resting frequency, said method comprising creating stimulus frequency which is a multiple of the brain resting frequency, imposing the stimulus frequency on the brain of the animal having said brain resting frequency, modulating the stimulus frequency at the brain resting frequency, and maintaining the stimulus frequency within the audible frequency spectrum.

2. The method of claim 1 further characterized in that the brain resting frequency is between 8 and 13 cycles per second, and that the stimulus frequency is frequency modulated between 8,000 and 13,000 cycles per second.

3. The method of claim 1 further characterized in that the brain resting frequency is between 8 and 13 cycles per second, and that the stimulus frequency is modulated at 10 cycles per second.

4. The method of claim 3 further characterized in that the stimulus frequency is also held within a sound level of 120 to 150 decibels.

5. A device for creating a stimulus frequency and imposing the same on the brain of an animal having a resting frequency, said device comprising base means, a parabolic reflector operatively mounted on said base means, sound emitting means operatively mounted on said base means and being disposed forwardly of said reflector, amplifier means operatively connected to said sound emitting means, a frequency modulated circuit operatively connected to said amplifier means for producing a stimulus frequency, and a modulating circuit operatively connected to said frequency modulated circuit for modulating the output of said frequency modulated circuit, and to thereby modulate the stimulus frequency at the brain resting frequency.

6. The device of claim 5 further characterized in that the brain resting frequency is between 8 and 13 cycles per second, and that the stimulus frequency is frequency modulated between 8,000 and 13,000 cycles per second.

7. The device of claim 5 further characterized in that the brain resting frequency is between 8 and 13 cycles per second, and that the modulating frequency is 10 cycles per second.

8. The device of claim 5 further characterized in that a plurality of parabolic reflectors are operatively mounted on said base means, and a sound emitting means is disposed forwardly of said reflectors.

9. A device for forcibly dispersing animals having a brain resting frequency, said device comprising means for creating a stimulus frequency and imposing the same on the brain of an animal having said brain resting frequency, said stimulus frequency being a multiple of said brain resting frequency and being within the audible frequency spectrum, and means for modulating the stimulus frequency at the brain resting frequency.

10. The device of claim 9 further characterized in that the brain resting frequency is between 8 and 13 cycles per second, and that the stimulus frequency is frequency modulated between 8,000 and 13,000 cycles per second.

11. The device of claim 9 further characterized in that the brain resting frequency is between 8 and 13 cycles per second and that the modulating frequency is 10 cycles per second.

12. The device of claim 9 further characterized in that means is provided for maintaining the sound level within 120 to 150 decibels.